United States Patent
Wang

(10) Patent No.: US 7,907,243 B2
(45) Date of Patent: Mar. 15, 2011

(54) TRANSFLECTIVE LIQUID CRYSTAL DISPLAY PANEL

(75) Inventor: Ching-Yi Wang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 17 days.

(21) Appl. No.: 12/406,934

(22) Filed: Mar. 18, 2009

(65) Prior Publication Data

US 2009/0174850 A1    Jul. 9, 2009

Related U.S. Application Data

(63) Continuation of application No. 11/163,396, filed on Oct. 17, 2005, now Pat. No. 7,576,816.

(30) Foreign Application Priority Data

Dec. 24, 2004 (TW) ................ 93140408 A

(51) Int. Cl.
G02F 1/1333 (2006.01)
G02F 1/1335 (2006.01)

(52) U.S. Cl. .......... 349/138; 349/114; 349/112

(58) Field of Classification Search .......... 349/114, 349/138, 112, 122
See application file for complete search history.

(56) References Cited

U.S. PATENT DOCUMENTS

| | | | | |
|---|---|---|---|---|
| 5,067,797 | A * | 11/1991 | Yokokura et al. | 349/124 |
| 5,986,738 | A * | 11/1999 | Tagusa et al. | 349/138 |
| 6,707,521 | B2 * | 3/2004 | Satake et al. | 349/138 |
| 7,440,055 | B2 * | 10/2008 | Nam et al. | 349/114 |
| 2005/0083459 | A1 * | 4/2005 | Ukawa et al. | 349/114 |

* cited by examiner

*Primary Examiner* — W. Patty Chen
(74) *Attorney, Agent, or Firm* — Jianq Chyun IP Office

(57) ABSTRACT

A transflective pixel structure including a scan line, a data line, a thin film transistor, a pixel electrode and an organic material layer is provided. The scan line and the data line are disposed over a substrate. The thin film transistor is disposed over the substrate and electrically connected to the scan line and the data line. The pixel electrode is disposed over a substrate and is electrically connected to the thin film transistor. The pixel electrode has a reflective region and a transmissive region. The organic material layer covers both the thin film transistor and the pixel electrode. The organic material layer disposed correspondently above the transmissive region of the pixel electrode has a plurality of refracting patterns on its upper surface. The refracting patterns refract external light into the reflective region.

18 Claims, 6 Drawing Sheets

TRANSFLECTIVE LIQUID CRYSTAL DISPLAY PANEL

CROSS-REFERENCE TO RELATED APPLICATION

This application is a continuation application of and claims the priority benefit of a prior application Ser. No. 11/163,396, filed on Oct. 17, 2005, now pending. The prior application Ser. No. 11/163,396 claims the priority benefit of Taiwan application serial no. 93140408, filed on Dec. 24, 2004. The entirety of each of the above-mentioned patent applications is hereby incorporated by reference herein and made a part of this specification.

BACKGROUND OF THE INVENTION

1. Field of the Invention

This invention generally relates to a liquid crystal display (LCD) panel, a pixel structure and manufacturing process thereof, and more particularly, to a transflective LCD panel, a transflective pixel structure and manufacturing process thereof.

2. Description of Related Art

Due to rapid development of information industry, the application of display technology, especially for portable products, is striding forward to miniaturization, being thin and light, high brightness, low power wastage and high quality output of full color image etc.

In order to meet the requirements of the above mentioned portable products, a reflective LCD is provided in the prior art. The conventional reflective LCD panel uses electrical conductive materials having light beam reflectable character as the pixel electrode. The light reflection of the pixel from external light source is used as the light source for displaying images. The reflective LCD panel is not only taken as one of the most developing potential technologies, but also has been used for some massively-produced products. However, though the display device with the reflective LCD panel can display a clear image under ambient light condition, it is unable to output high quality images when the external light source is insufficient resulting in shortage of light source in the display device of the LCD. In other words, the recent conventional reflective LCD cannot effectively solve the problem that the performance of a display device is restricted by the brightness of the external environment.

In view of the above-mentioned situation, a transflective LCD panel, which integrates a reflective LCD panel with a transmissive LCD panel is provided. The transmissive LCD panel uses a transparent electrical conductive material as the pixel electrode of a pixel, such as indium tin oxide (ITO), and a backlight module is used to make light pass through the transparent pixel electrode for image display. In the transflective LCD panel, each pixel electrode comprises a reflective electrical conductive thin film and a transparent electrical conductive thin film. The display device adapted with this LCD panel outputs a good image when the external light is sufficient. Furthermore, the display device can also achieve a good image output effect when the external light source is insufficient through the backlight module of the display device. However, for the LCD, the light reflecting ratio of the pixel is in a direct proportion to the area of the reflective electrical conductive thin film. The area of the reflective electrical conductive thin film must be increased accordingly if the light reflecting ratio of the reflecting portion of the pixel is to be increased. As a result, the opening ratio of the transmissive portion of the pixel will be affected. If the opening ratio of the transmissive portion of the pixel is not sufficient, in order to maintain image output quality, the brightness of the backlight source must be increased. Consequently, more power wastage is occurred.

SUMMARY OF THE INVENTION

An objective of the present invention is to provide a transflective pixel structure with high light reflecting ratio and a manufacturing process thereof.

Another objective of the present invention is to provide a transflective LCD panel with high brightness and low power wastage.

The present invention provides a transflective pixel structure, which comprises a scan line, a data line, a thin film transistor, a pixel electrode and an organic material layer. The scan line and the data line are disposed over a substrate. The thin film transistor is disposed over the substrate and is electrically connected to the scan line and data line. The pixel electrode is disposed over the substrate and is electrically connected to the thin film transistor, and the pixel electrode comprises a reflective region and a transmissive region. The organic material layer covers the thin film transistor and the pixel electrode, wherein the organic material layer disposed over the transmissive region of the pixel electrode comprises a plurality of refracting patterns on its upper surface, and the refracting patterns refract external light into the reflective region.

In accordance with the transflective pixel structure described in the preferred embodiments of the present invention, wherein the thickness of the organic material layer is, for example, between 500 angstroms to 30000 angstroms.

In accordance with the transflective pixel structure described in the preferred embodiments of the present invention, wherein the refracting patterns are concave patterns, convex patterns or a combination thereof.

In accordance with the transflective pixel structure described in the preferred embodiments of the present invention, wherein the concave patterns comprise, for example, a plurality of round recessions with a diameter, for example, between 2 μm to 10 μm.

In accordance with the transflective pixel structure described in the preferred embodiments of the present invention, wherein the transflective pixel structure, for example, further comprises a refracting material layer which covers conformably on the upper surface of the organic material layer over the transmissive region of the pixel electrode. The thickness of the organic material layer is, for example, between 20000 angstroms to 25000 angstroms, and the refracting material layer comprises, for example, crystallized silicon.

In accordance with the transflective pixel structure in the preferred embodiments of the present invention, wherein the transflective pixel structure further comprises a plurality of bumps disposed correspondingly underneath the reflective region of the pixel electrode, and the reflective region of the pixel electrode comprises, for example, a metal material.

In accordance with the transflective pixel structure in the preferred embodiments of the present invention, wherein the transmissive region of the pixel electrode comprises, for example, a metal oxide material.

The present invention provides a transflective LCD panel comprising a first substrate, a second substrate and a liquid crystal layer. The second substrate comprises at least one electrode film thereon, and the liquid crystal layer is disposed between the first substrate and the second substrate. The first substrate comprises a plurality of scan lines, a plurality of data lines, a plurality of thin film transistors, a plurality of pixel electrodes and an organic material layer. The scan lines and the data lines define a plurality of pixel regions. Each thin film transistor is disposed in each of the pixel regions, and each thin film transistor is electrically connected to one of the scan lines and one of the data lines correspondingly. The pixel electrodes are respectively disposed in each of the pixel regions and electrically connected to each of the thin film transistors. In particular, each pixel electrode comprises a reflective region and a transmissive region.

In accordance with the transflective LCD panel in the preferred embodiments of the present invention, wherein the thickness of the organic material layer is for example between 500 angstroms and 30000 angstroms, and the refracting patterns which are formed on the upper surface of the organic material layer are concave patterns, convex patterns or a combination thereof, and the refracting patterns refract external light into the reflective region.

In accordance with the transflective LCD panel in the preferred embodiments of the present invention, wherein the concave patterns can be, for example, a plurality of round recessions with a diameter, for example, between 2 μm to 10 μm.

In accordance with the transflective LCD panel in the preferred embodiments of the present invention, further comprising a refracting material layer which covers conformably on the upper surface of the organic material layer over the transmissive region of the pixel electrode. The thickness of the organic material layer is, for example, between 20000 angstroms to 25000 angstroms, and the refracting material layer comprises, for example, crystallized silicon.

In accordance with the transflective LCD panel in the preferred embodiments of the present invention, further including a plurality of bumps disposed underneath the reflective region of the pixel electrode, and the reflective region of the pixel electrode comprises, for example, a metal material.

In accordance with the transflective LCD panel in the preferred embodiments of the present invention, wherein the transmissive region of the pixel electrode comprises, for example, a metal oxide material.

In accordance with the transflective LCD panel in the preferred embodiments of the present invention, wherein the second substrate further comprises a color filter layer thereon.

The present invention provides a manufacturing process of a pixel structure. First, a scan line and a gate are formed on a substrate. Then a gate insulating layer is formed on the substrate to cover the scan line and the gate. A channel layer is formed on the gate insulating layer over the gate. A source and a drain are formed on the channel layer, and a data line is also formed and electrically connected to the source. Further, a pixel electrode is formed over the substrate which is electrically connected to the drain, and the pixel electrode comprises a reflective region and a transmissive region. Furthermore, an organic material layer is formed over the substrate to cover the pixel electrode and the thin film transistor. A plurality of refracting patterns is formed on the upper surface of the organic material layer over transmissive region of the pixel electrode.

In accordance with the manufacturing process described in the preferred embodiments of the present invention, wherein the refracting pattern is selected from a concave pattern, a convex pattern or a combination thereof.

In accordance with the manufacturing process in the preferred embodiments of the present invention, further comprising forming a refracting material layer conformably on the upper surface of the organic material layer over the transmissive region of the pixel electrode after forming the refracting patterns on the upper surface of the organic material layer.

In accordance with the manufacturing process in the preferred embodiments of the present invention, wherein the refracting patterns on the upper surface of the organic material layer are formed by a photolithography process.

Since the refracting patterns are formed on the upper surface of the organic material layer over the transmissive region of the pixel electrode, the external light which originally emits to the transmissive region but was unable are utilized by the reflective region because the external light originally unable can be refracted by the refracting patterns and emits into the reflective region so as to increase the light reflecting ratio of the reflective region of the pixel electrode. Besides, if the refracting material layer is formed on the organic material layer, the light refracting effect is further improved so as to further increase the light reflecting ratio of the reflective region of the pixel electrode. Since the above mentioned refracting pattern design is used in the LCD panel of the present invention, the effect of the light reflecting ratio of the reflective region of the pixel electrode can be increased and the LCD panel brightness can be therefore increased.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

First Embodiment

Figure 1A:
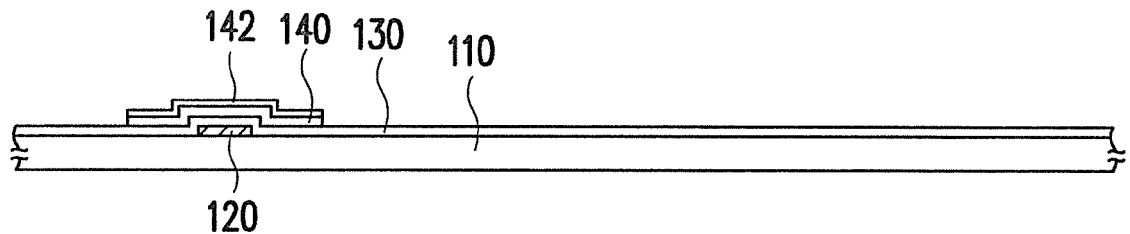
FIG. 1A to FIG. 1F are drawings schematically showing cross-sectional views of a manufacturing process flow of a transflective pixel structure according to a first embodiment of the present invention.

FIG. 1A to FIG. 1F are drawings schematically showing cross-sectional views of a manufacturing process flow of a transflective pixel structure according to a first embodiment of the present invention. FIG. 2 is a drawing schematically showing a top view of a transflective pixel structure according to the first embodiment of the present invention. As shown in FIG. 1A and FIG. 2, a scan line 190 and a gate 120 are formed on a substrate 110. The substrate 110 is for example a glass substrate, a plastic substrate or other suitable substrates. The scan line 190 and the gate 120 are, for example, made of chromium, tantalum or other metal materials. A gate insulating layer 130 is formed to cover the scan line 190 and the gate 120. The gate insulating layer 130 is, for example, a silicon oxide layer, a silicon nitride layer or other dielectric layers. Furthermore, a channel layer 140 is formed on the gate insulating layer 130, wherein the channel layer 140 is made of, for example, amorphous silicon. In an embodiment of the present invention, an ohmic contact layer 142 may further be formed on the channel layer 140. The ohmic contact layer 142 is, for example, an n-type doped amorphous silicon layer.

Figure 1B:
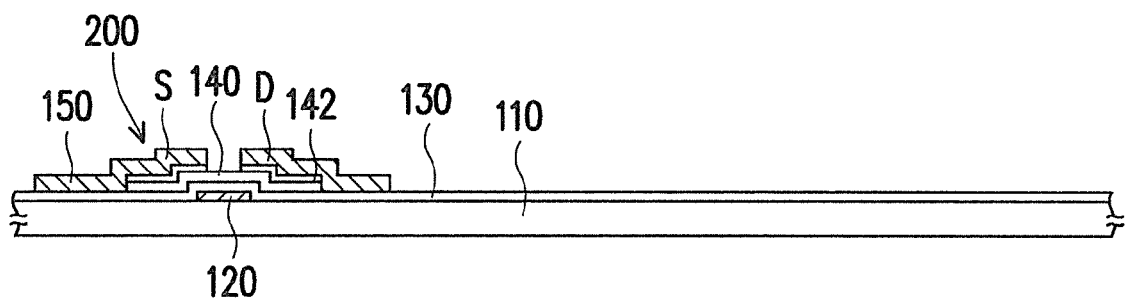
Figure 2:
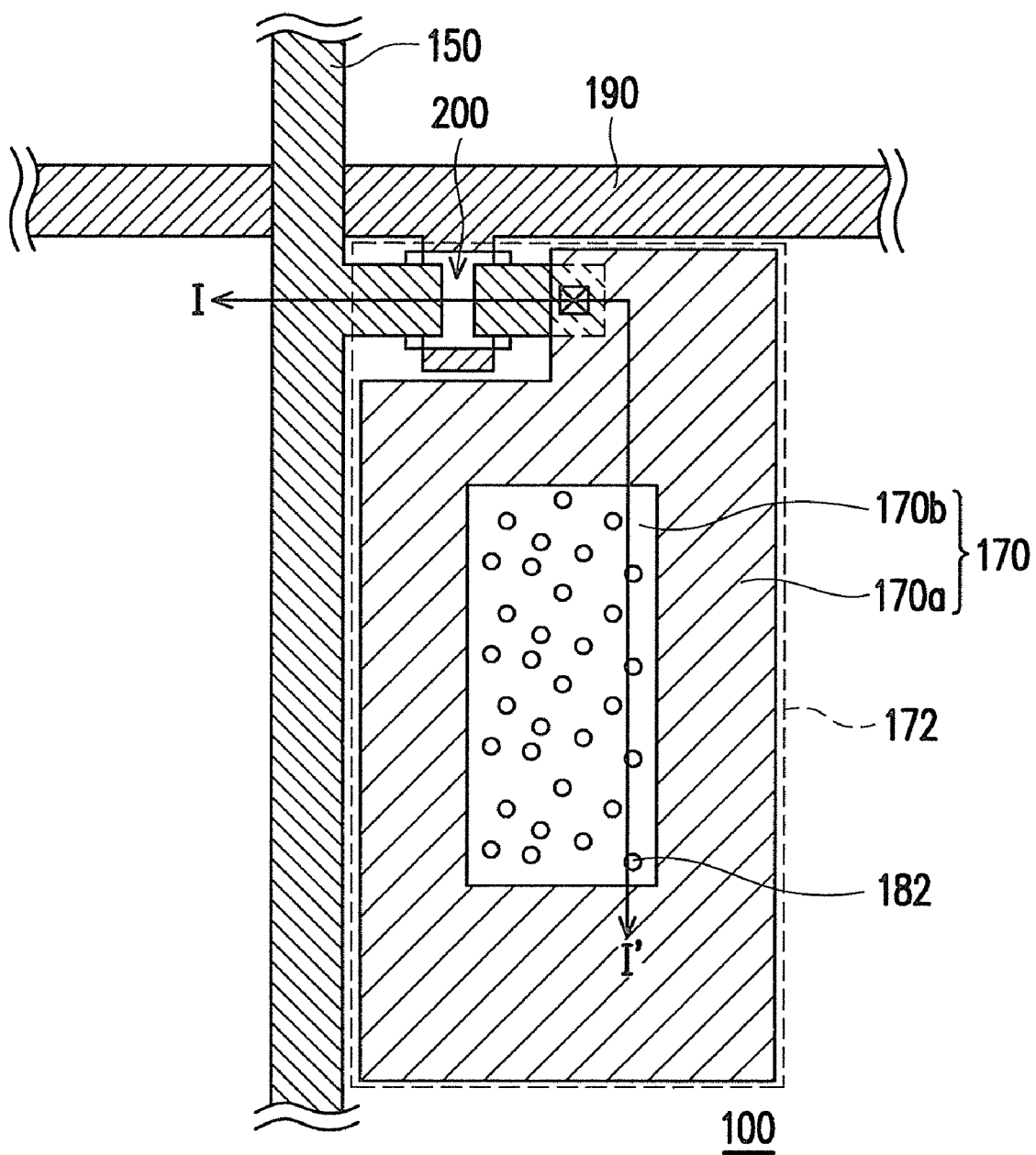
FIG. 2 is a drawing schematically showing a top view of a transflective pixel structure according to the first embodiment of the present invention.

As shown in FIG. 1B, a source S and a drain D are formed on the channel layer 140, and a data line 150 is also formed at the same time. The data line 150 is electrically connected to the source S. The source S, the drain D and the data line 150 are made of, for example, chromium, tantalum or other metal materials. After forming the source S and the drain D, a portion of the ohmic contact layer 142, which is not covered by the source S and the drain D, is removed by utilizing the source S and the drain D as an etching mask (In general, it is called "back channel etching"). A thin film transistor 200 is accordingly formed.

Figure 1C:
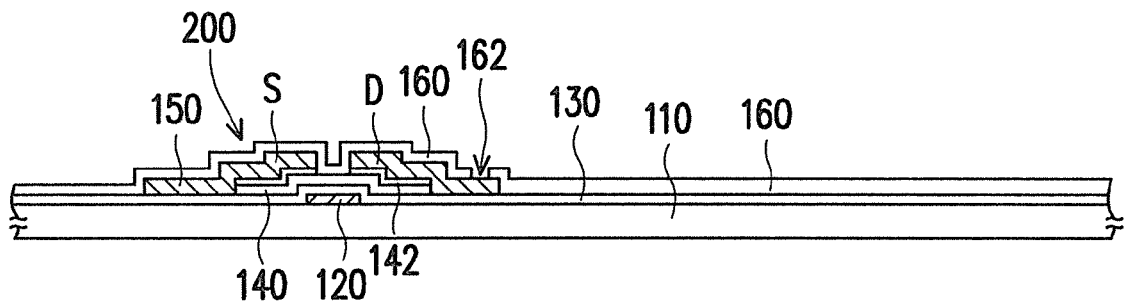

As shown in FIG. 1C, after the thin film transistor 200 has been formed, a protective layer 160 is formed over the substrate 110. Further, an opening 162 is formed in the protective layer 160 for exposing the drain D.

Figure 1D:
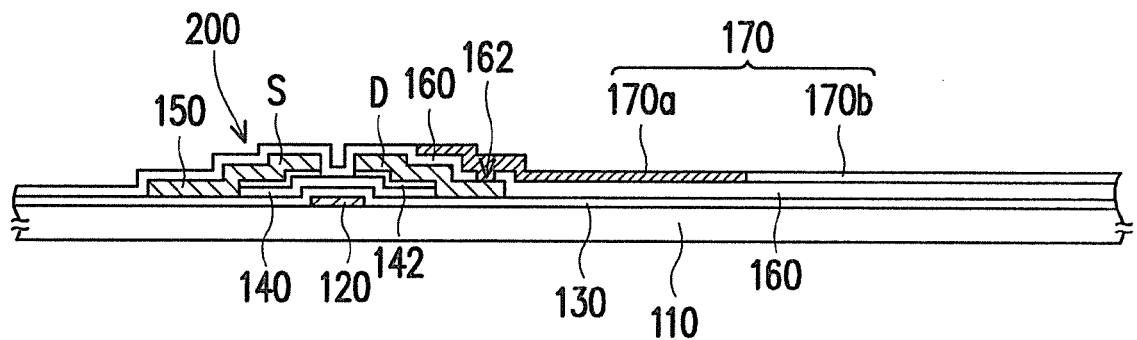

As shown in FIG. 1D, a pixel electrode 170 is formed on the protective layer 160, and the pixel electrode 170 is electrically connected to the drain D. In the embodiment of the present invention, the pixel electrode 170 is electrically connected to the drain D through the opening 162. Further, the pixel electrode 170 has two parts, a reflective region 170a and a transmissive region 170b. The material of the reflective region 170a can be, for example, aluminum or other metal materials having reflecting character, and the material of the transmissive region 170b can be, for example, indium tin oxide (ITO) or indium zinc oxide (IZO). In FIG. 2 of the embodiment of the present invention, the transmissive region 170b is disposed at the center of the pixel region 172 and the reflective region 170a is disposed in the surrounding area of the transmissive region 170b. It is to be understood that the illustrated embodiment herein should not be treated as limitation thereof. In the present invention, the reflective region 170a and the transmissive region 170b of the pixel electrode 170 can be arranged in any manner.

Figure 1E:
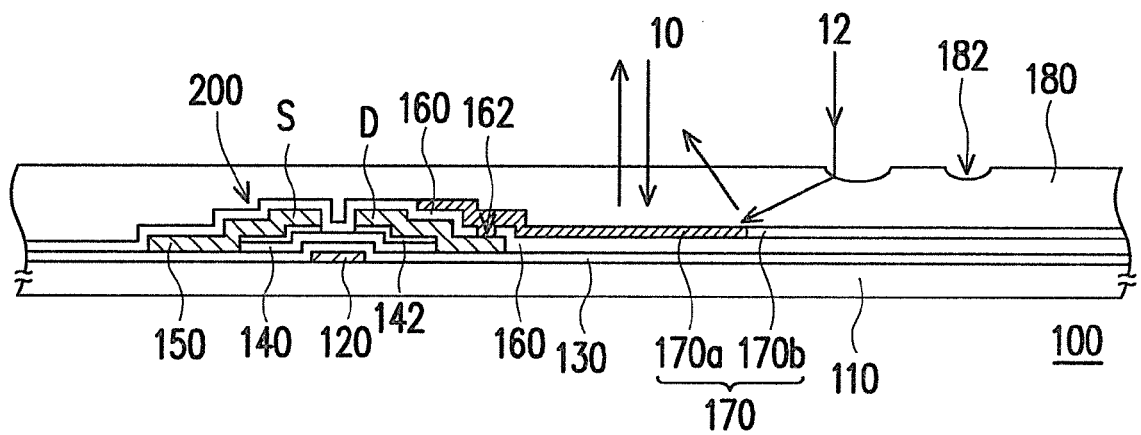
Figure 1F:
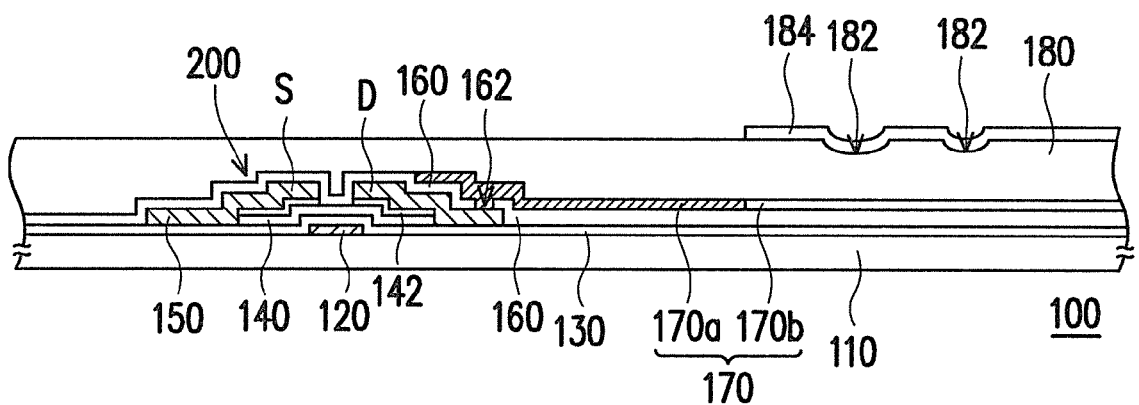

Referring to FIG. 1E, an organic material layer 180 is formed over the substrate 110 to cover the pixel electrode 170 and the thin film transistor 200. The organic material layer 180 can be, for example, a photoresist material with a thickness, for example, approximately between 500 angstroms and 30000 angstroms. The method of forming the organic material layer 180, for example, is to prepare a photoresist material solution first. Then, the solution is, for example, spin coated on the pixel electrode 170 and the thin film transistor 200, and a baking process is performed so that the pixel electrode 170 and the thin film transistor 200 are covered by the organic material layer 180. Next, a photolithography process is performed to form several refracting patterns 182 on an upper surface of the organic material layer 180 over the transmissive region 170b of the pixel electrode 170. Thus, a transflective pixel structure 100 is formed. The refractive patterns 182 can be concave patterns, convex patterns or a combination thereof. In the embodiment of the present invention, the refractive patterns 182 are, for example, round recessions or similar patterns, and the diameter of the round recessions is between 2 μm and 10 μm. In another embodiment of the present invention as shown in FIG. 1F, after the refracting patterns 182 are formed, a refracting material layer 184 can be further formed conformably on the organic material layer 180 over the transmissive region 170b of the pixel electrode 170, wherein the refracting material layer 184 comprises, for example, crystallized silicon. If the refracting material layer 184 is further formed on the organic material layer 180, the suitable thickness of the organic material layer 180 is between 20000 angstroms and 25000 angstroms.

In accordance with FIG. 1E and FIG. 2, the transflective pixel structure 100, which is formed by the above-mentioned manufacturing process, comprises a scan line 190, a data line 150, a thin film transistor 200, a pixel electrode 170 and an organic material layer 180. The scan line 190 and the data line 150 are disposed over the substrate 100. A pixel region 172 is defined by the scan line 190, a next scan line (not shown), the data line 150 and a next data line (not shown). The thin film transistor 200 is disposed in the pixel region 172 and is electrically connected to the scan line 190 and the data line 150. The pixel electrode 170 is disposed in the pixel region 172 and is electrically connected to the thin film transistor 200. The pixel electrode 170 further comprises a refractive region 170a and a transmissive region 170b. The organic material layer 180 covers the thin film transistor 200 and the pixel electrode 170, and comprises refractive patterns 182 on the upper surface of the organic material layer 180 over the transmissive region 170b of the pixel electrode 170.

Further, according to FIG. 1E and FIG. 2, when external light 10 is radiated onto the reflective region 170a of the pixel electrode 170 through the organic material layer 180, the external light 10 is reflected from the reflective region 170a and becomes the light source for display. When external light 12 is radiated onto the refracting patterns 182 on the organic material layer 180, the external light 12 can be refracted onto the reflective region 170a, and through reflection, becomes one of the light sources for display. Furthermore, in another embodiment of the present invention as shown in FIG. 1F, the refracting material layer 184 covers conformably the surface of the organic material layer 180 over the transmissive region 170b of the pixel electrode 170 for increasing the effect of the light refract into the reflective region 170a.

As described, the transflective pixel structure of the embodiment of the present invention, through the refracting patterns on the organic material layer or with an additional design of the refracting material layer on the organic material layer can refract external light, such as the light 12, which originally emitted to the transmissive region but was unable, into the reflective region as a light source for display. Hence, the reflecting ratio of the pixel electrode is increased.

Second Embodiment

Figure 3A:
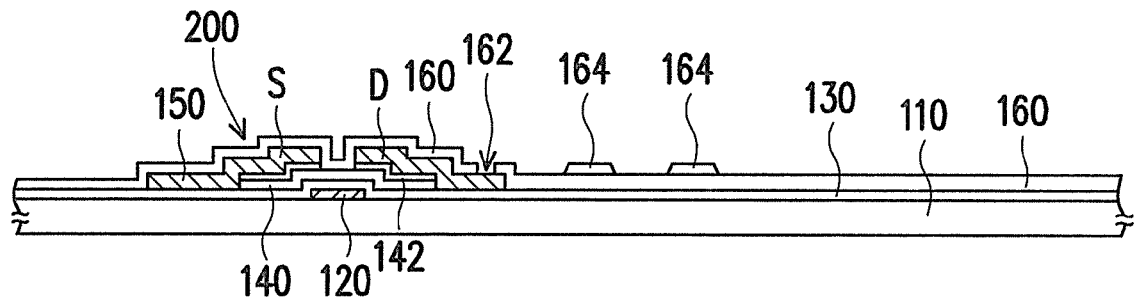
FIG. 3A to FIG. 3D are drawings schematically showing cross-sectional views of a manufacturing process flow of a transflective pixel structure according to a second embodiment of the present invention.

FIG. 3A to FIG. 3D are drawings schematically showing cross-sectional views of a manufacturing process flow of a transflective pixel structure according to a second embodiment of the present invention. Since the embodiment is similar with the first embodiment, the references in the first embodiment are used in the embodiment. Referring to FIG. 3A, first, the manufacturing process steps mentioned in the first embodiment shown as FIG. 1A to FIG. 1B are performed. Further, a protective layer 160 is formed over the substrate 110. Then, a plurality of bumps 164 is formed on the protective layer 160 that a reflective region of the pixel electrode will be formed subsequently. The bumps 164 are made of, for example, organic resin or other organic material. The method for forming the bumps 164 is that, for example, an organic material (not shown) is formed on the above-mentioned structure, and then a photolithography process is performed to form the bumps 164.

Figure 3B:
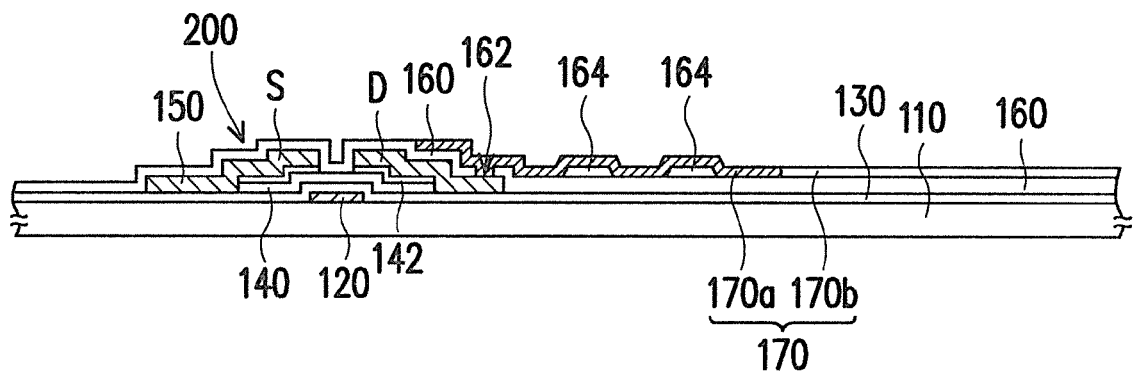

Referring to FIG. 3B, a pixel electrode 170 is formed on the protective layer 160 and covers the bumps 164, and the pixel electrode 170 is electrically connected to the drain D. The pixel electrode 170 has two parts, a reflective region 170a and a transmissive region 170b. The reflective region 170a of the pixel electrode 170 is formed in the region that the bumps 164 have been formed correspondingly.

Figure 3C:
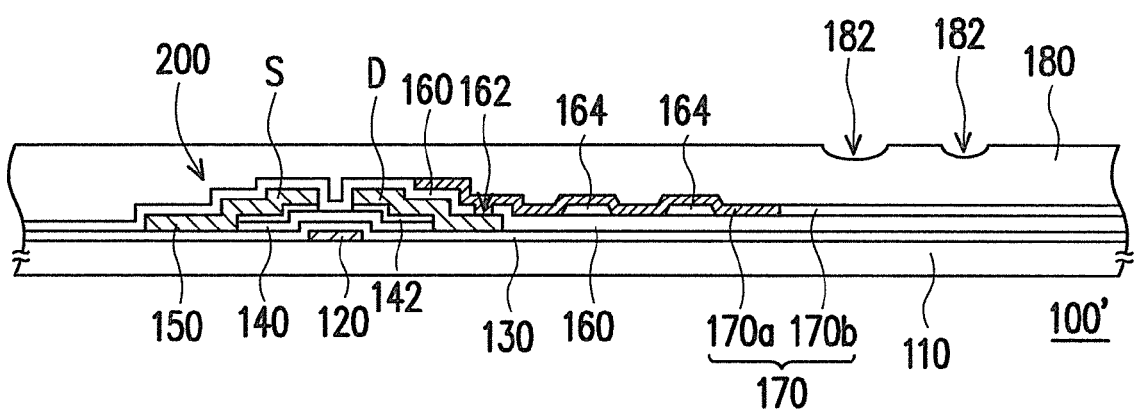
Figure 3D:
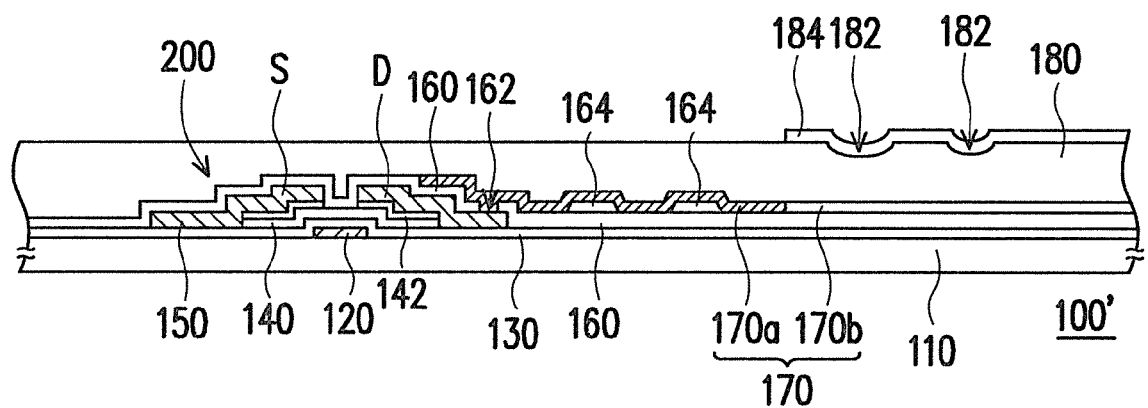

According to FIG. 3C, an organic material layer 180 is formed over the substrate 110 and covers the pixel electrode 170 and the thin film transistor 200. The material and forming process of the organic material layer 180 are the same or similar as in the first embodiment. After the organic material layer 180 covering the pixel electrode 170 and the thin film transistor 200 is formed, the refracting patterns 182 are formed on the upper surface of the organic material layer 180 over the transmissive region 170b of the pixel electrode 170. A transflective pixel structure 100 is therefore formed. In another embodiment of the present invention as shown in FIG. 3D, after the refracting pattern 182 has been formed, a refracting material layer 184 can be further formed conformably on the organic material layer 180 over the transmissive region 170b of the pixel electrode 170. The refracting material layer 184 comprises, for example, crystallized silicon.

According to the above mentioned, owing to the design of the bumps 164 of the embodiment in the present invention, the surface of the reflective region 170a of the pixel electrode 170 is a curving surface with rise and fall. Therefore, the light reflecting effect of the reflective region 170a can be increased and the light reflecting ratio of the reflective region 170a can also be improved.

Figure 4:
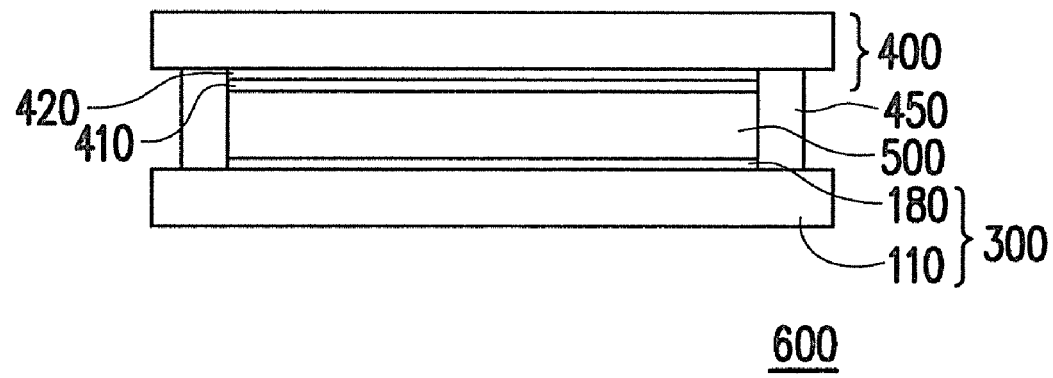
FIG. 4 is a drawing schematically showing a view of a transflective LCD panel according to an embodiment of the present invention.

FIG. 4 is a drawing schematically showing a view of a LCD panel with the transflective pixel structure according to an embodiment of the present invention. As shown in FIG. 4, the transflective LCD panel 600 comprises a first substrate 300, a second substrate 400 and a liquid crystal layer 500. The second substrate 400 comprises at least an electrode film 410 thereon, and the liquid crystal layer 500 is formed the first substrate 300 and the second substrate 400, and the first substrate 300 and the second substrate 400 are sealed by a sealant 450.

Figure 5:
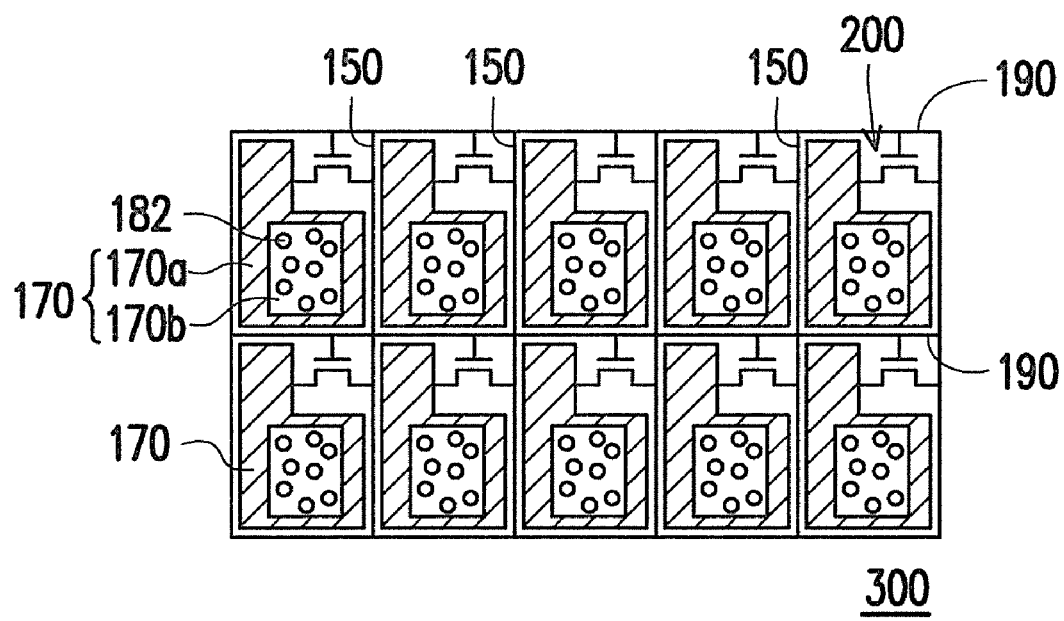
FIG. 5 is a drawing schematically showing a top view of the first substrate according to FIG. 4.

FIG. 5 is a drawing schematically showing a top view of the first substrate 300 according to FIG. 4. Since the manufacturing process of the first substrate 300 is similar with that of the first embodiment or of the second embodiment, the same references as indicated in the first embodiment or the second embodiment are used in the embodiment. As shown in FIG. 5, the first substrate 300 comprises a plurality of pixel structures, and each pixel structure is as shown in FIG. 1E or FIG. 1F of the first embodiment, or FIG. 3C or FIG. 3D of the second embodiment. Further, the second substrate 400, in addition to comprising the electrode film 410, may further comprise a color filter layer 420, for example.

As mentioned, each pixel structure of the transflective LCD panel of the present invention comprises the character of the transflective pixel structure mentioned in the first embodiment or the second embodiment, i.e. utilizing the refracting patterns on the organic material layer or with the additional refracting material layer to increase the reflecting ratio of the reflective region of the pixel electrode, and thus the transflective LCD panel of the present invention has advantages of high brightness and low power wastage.

In summary of the above mentioned, the transflective pixel structure of the present invention adds an organic material layer having the refracting patterns in the manufacturing process. Through the refracting patterns of the organic material layer or the design of the refracting patterns and the refracting material layer, the lights emits to the transmissive region, that were originally unable, can now be refracted into the reflective region to be utilized. Hence, the light reflecting ratio of the pixel electrode can be increased. Besides, by utilizing the bumps disposed underneath the reflective region of the pixel electrode, the light reflecting ratio of the transflective pixel structure is further increased. Application of the transflective pixel structure to the transflective LCD panel will improve the brightness and reduce power wastage.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A transflective pixel structure, comprising:
   a scan line and a data line disposed over a substrate;
   a thin film transistor disposed over a substrate, wherein the thin film transistor is electrically connected to the scan line and the data line;
   a pixel electrode disposed over a substrate, wherein the pixel electrode is electrically connected to the thin film transistor, and the pixel electrode comprises a reflective region and a transmissive region;
   an organic material layer covering the thin film transistor and the pixel electrode, wherein the organic material layer comprises a plurality of refracting patterns on an upper surface of the organic material layer over the transmissive region of the pixel electrode, and the refracting patterns refract external light into the reflective region; and
   a refracting material layer which covers conformably on the upper surface of the organic material layer over the transmissive region of the pixel electrode.

2. The transflective pixel structure of claim 1, wherein the organic material layer has a thickness between 500 angstroms and 30000 angstroms.

3. The transflective pixel structure of claim 1, wherein the refracting patterns are concave patterns, convex patterns or a combination thereof.

4. The transflective pixel structure of claim 3, wherein the concave patterns formed on the upper surface of the organic material layer comprise a plurality of round recessions.

5. The transflective pixel structure of claim 4, wherein the round recessions have a diameter between 2 μm and 10 μm.

6. The transflective pixel structure of claim 1, wherein the organic material layer has a thickness between 20000 angstroms and 25000 angstroms.

7. The transflective pixel structure of claim 1, wherein the refracting material layer comprises crystallized silicon.

8. The transflective pixel structure of claim 1, further comprising a plurality of bumps disposed underneath the reflective region of the pixel electrode.

9. The transflective pixel structure of claim 1, wherein the reflective region of the pixel electrode comprises a metal material.

10. The transflective pixel structure of claim 1, wherein the transmissive region of the pixel electrode comprises a metal oxide material.

11. A transflective liquid crystal display panel, comprising:
    a first substrate, comprising:
    a plurality of scan lines and a plurality of data lines to define a plurality of pixel regions;
    a plurality of thin film transistors respectively disposed in each of the pixel regions, wherein each thin film transistor is electrically connected to one of the scan lines and one of the data lines correspondingly;
    a plurality of pixel electrodes respectively disposed in each of the pixel regions, wherein each pixel electrode is electrically connected to one of the thin film transistors correspondingly, and each pixel electrode comprises a reflective region and a transmissive region;

an organic material layer, covering the thin film transistors and the pixel electrodes, wherein the organic material layer comprises a plurality of refracting patterns on its upper surface over the transmissive regions of the pixel electrodes, and the refracting patterns refract external light into the reflective region;

a second substrate comprising an electrode film thereon;

a liquid crystal layer disposed between the first substrate and the second substrate; and a refracting material layer which covers conformably on the upper surface of the organic material layer over the transmissive region of the pixel electrode.

12. The transflective liquid crystal display panel of claim 11, wherein the refracting pattern are concave patterns, convex patterns or a combination thereof.

13. The transflective liquid crystal display panel of claim 11, wherein the organic material layer has a thickness between 500 angstroms and 30000 angstroms.

14. The transflective liquid crystal display panel of claim 12, wherein the concave patterns formed on the upper surface of the organic material layer comprises a plurality of round recessions.

15. The transflective liquid crystal display panel of claim 14, wherein the round recessions has a diameter between 2 µm and 10 µm.

16. The transflective liquid crystal display panel of claim 11, wherein the organic material layer has a thickness between 20000 angstroms and 25000 angstroms.

17. The transflective liquid crystal display panel of claim 11, wherein the refracting material layer comprises crystallized silicon.

18. The transflective liquid crystal display panel of claim 11, wherein the second substrate further comprises a color filter layer thereon.

* * * * *